(12) United States Patent
Chen (10) Patent No.: US 6,979,019 B2
(45) Date of Patent: Dec. 27, 2005

(54) COMBINED GOLF BAG AND GOLF CART OPERABLE BY ONE HAND

(75) Inventor: Kwei-Pao Chen, Taipei (TW)

(73) Assignee: Ramiko Co., Ltd., Taipei (TW)

( * ) Notice: Subject to any disclaimer, the term of this patent is extended or adjusted under 35 U.S.C. 154(b) by 174 days.

(21) Appl. No.: 10/697,166

(22) Filed: Oct. 31, 2003

(65) Prior Publication Data

US 2005/0029762 A1    Feb. 10, 2005

(30) Foreign Application Priority Data

Aug. 7, 2003    (TW) .............................. 92121730 A (51) Int. Cl.⁷ .......................... B62B 1/20; B62B 11/00
(52) U.S. Cl. .................. 280/652; 280/35; 280/47.131; 280/47.17; 280/639; 280/645; 280/646; 280/DIG. 6
(58) Field of Search ............................ 280/30, 639, 38, 280/641, 645, 646, 651, 655, 659, DIG. 6

(56) References Cited

U.S. PATENT DOCUMENTS 6,050,592 A * 4/2000 Kim ........................... 280/652
6,056,301 A * 5/2000 Berliner et al. ............ 280/43.1

* cited by examiner

*Primary Examiner*—Allen Shriver
*Assistant Examiner*—Cynthia Collado
(74) *Attorney, Agent, or Firm*—Troxell Law Office, PLLC (57) ABSTRACT

Disclosed is a combined golf bag and golf cart. A support mechanism thereof comprises a lower support tube, an abutment tube, two link arms, a lower coupling tube, an upper support tube, a sliding tube, an upper coupling tube, and a retractable handle assembly. A pressing of a push button by a finger of one hand grasping a handle will unlock a wheel assembly for extending wheels outwardly prior to transporting along a playing field.

14 Claims, 13 Drawing Sheets

COMBINED GOLF BAG AND GOLF CART OPERABLE BY ONE HAND

BACKGROUND OF THE INVENTION

1. Field of the Invention

The present invention relates to golf equipment and more particularly to an improved combined golf bag and golf cart having wheels adapted to either extend or collapse by operating the handle by only one hand.

2. Description of Related Art

Combining a golf bag and a golf cart into one unit for facilitating a golfer to transport the golf bag to any place in the playing field is well known. For example, U.S. Pat. No. 6,050,592 disclosed a combined golf bag and collapsible golf cart in which a finger of the hand grasping a pull handle can pull a lock release ring to unlock a locking mechanism through a cable so that the unit can go from a retracted position to an extended position. To the contrary, wheel mechanisms can be retracted to nest against a golf bag assembly when the unit is not in use, thereby saving storage space.

However, the patent suffered from two disadvantages. For example, a pulling of the handle can move the wheels upwardly and outwardly through the support rods, the hinge plate, and other associated members. Unfortunately, a smooth extension of the wheels is not easy to obtain since the pulling force exerted on the support rods, the hinge plate, and the associated members may not balance in both sides. Moreover, as shown in FIGS. 6 to 8 of the patent, a substantial force is required to exert for extending the wheels due to the provision of the tension springs in the moving structure. Hence, it requires one handle to pull the handle and the other hand to hold the golf bag in place in operation. Such operation involving two hands is not convenient. Thus, the need for improvement still exists.

SUMMARY OF THE INVENTION

It is an object of the present invention to provide a combined golf bag and golf cart having wheels adapted to either extend or collapse by operating a retractable handle by only one hand.

The above and other objects, features and advantages of the present invention will become apparent from the following detailed description taken with the accompanying drawings.

DETAILED DESCRIPTION OF THE PREFERRED EMBODIMENTS

Figure 13:
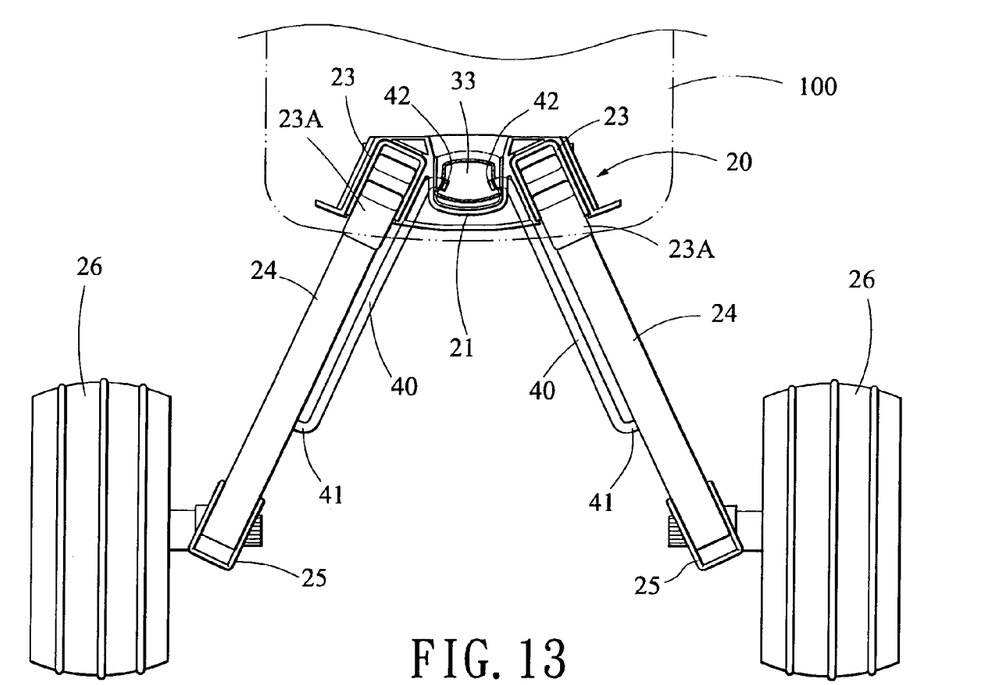
FIG. 13 is a schematic top plan view showing the extended wheels.

Referring to FIGS. 1 to 15, there is shown a golf bag and a golf cart combined into a unit in accordance with the invention. The unit comprises a longitudinal support mechanism 10 having a section of arcuate shape, a wheel assembly 20 detachably formed with the support mechanism 10, the wheel assembly 20 comprising two pairs of wheel mounts 24 and 24A having a section of arcuate shape (see FIGS. 2, 6, 13), each pair having a wheel 26 mounted at a lower end, the wheels 26 being adapted to withstand the weight of the unit, a retractable handle assembly 30 inserted in the support mechanism 10, a honeycomb structure 100 fastened at an upper part of the handle assembly 30, and a container 101 fastened at a lower part of the support mechanism 10. Each component will be described in detail below.

Figure 1:
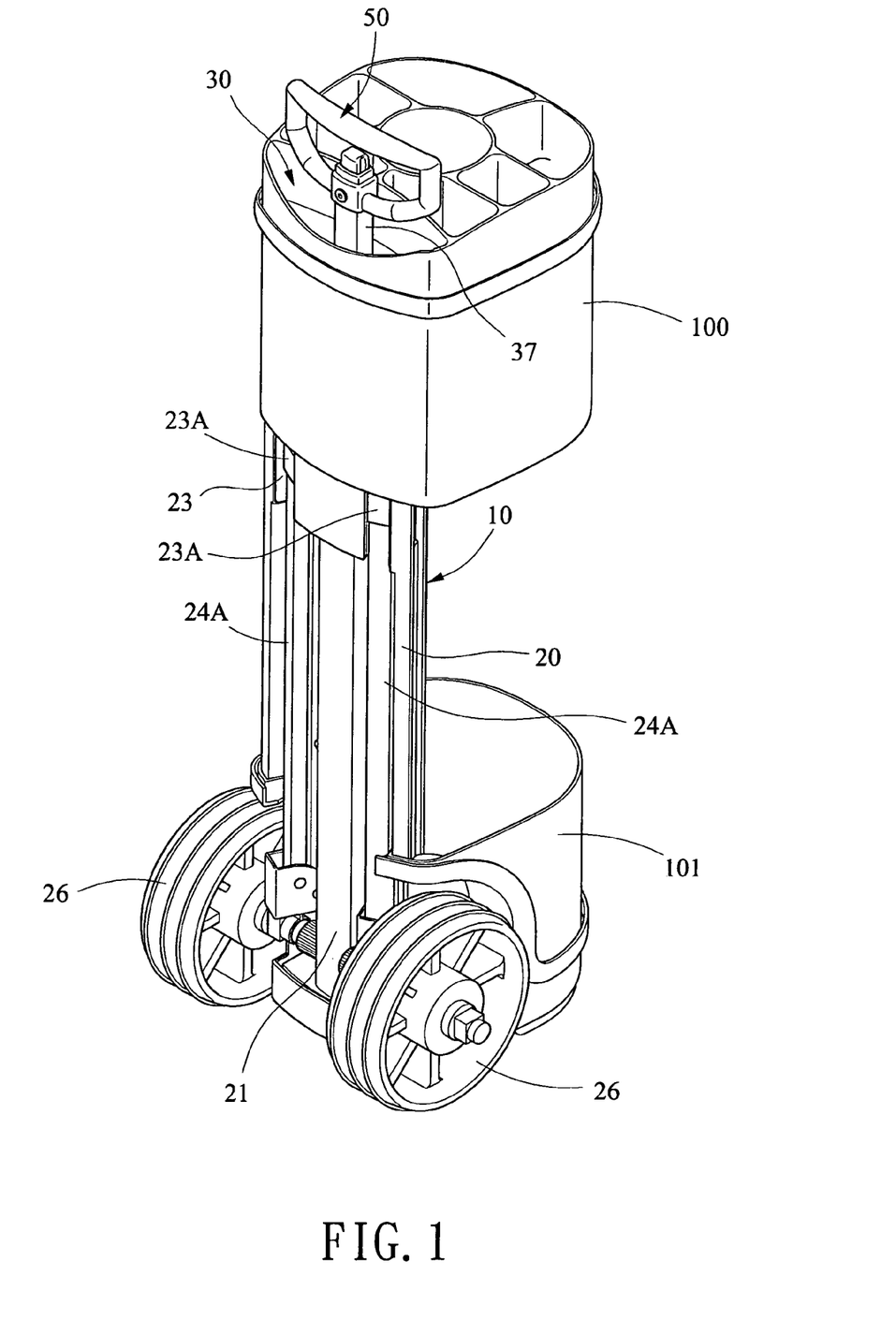
FIG. 1 is a perspective view of a preferred embodiment of combined golf bag and golf cart according to the invention, where the golf cart is in a retracted position.
Figure 2:
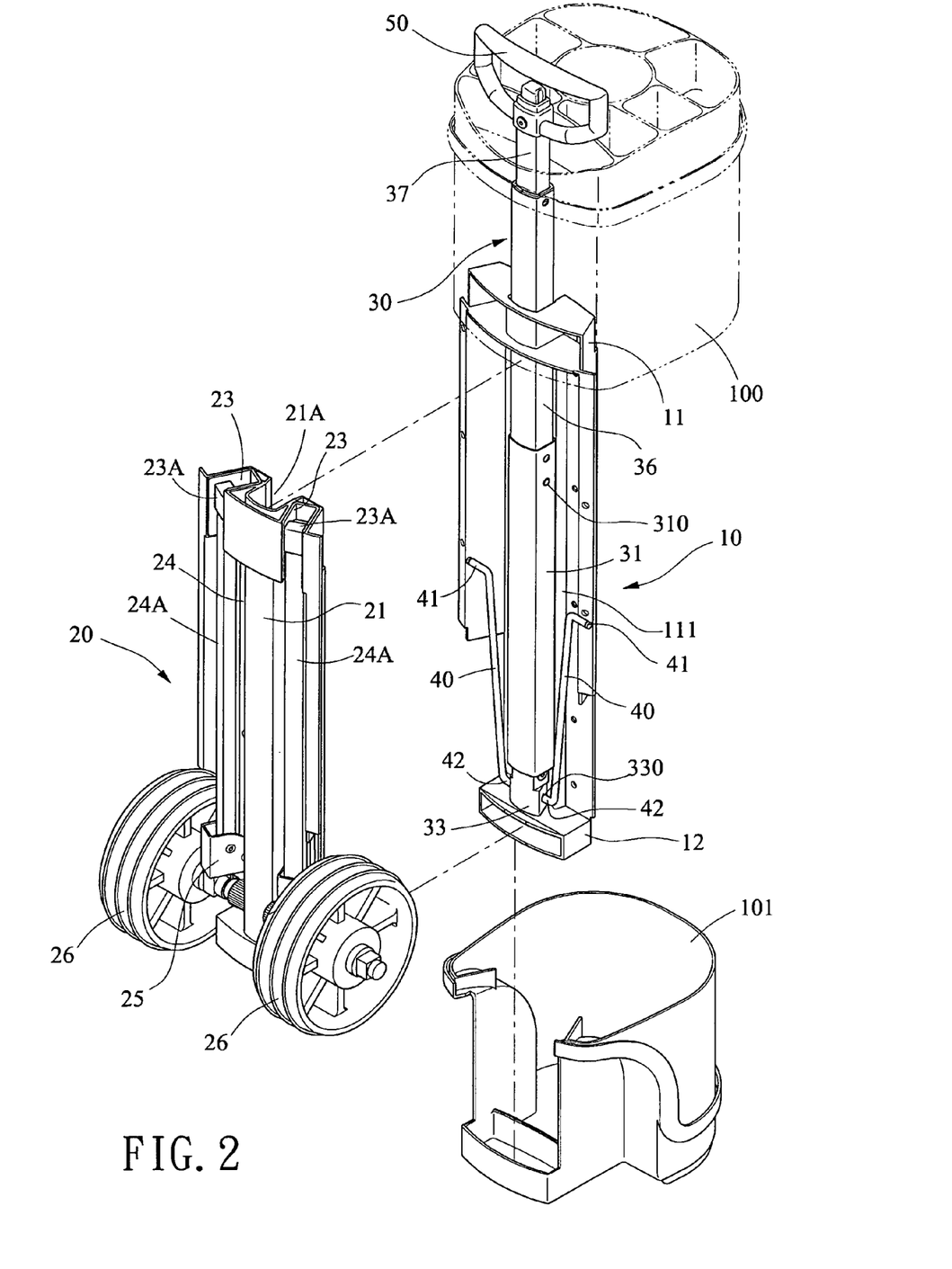
FIG. 2 is an exploded view of FIG. 1.
Figure 3:
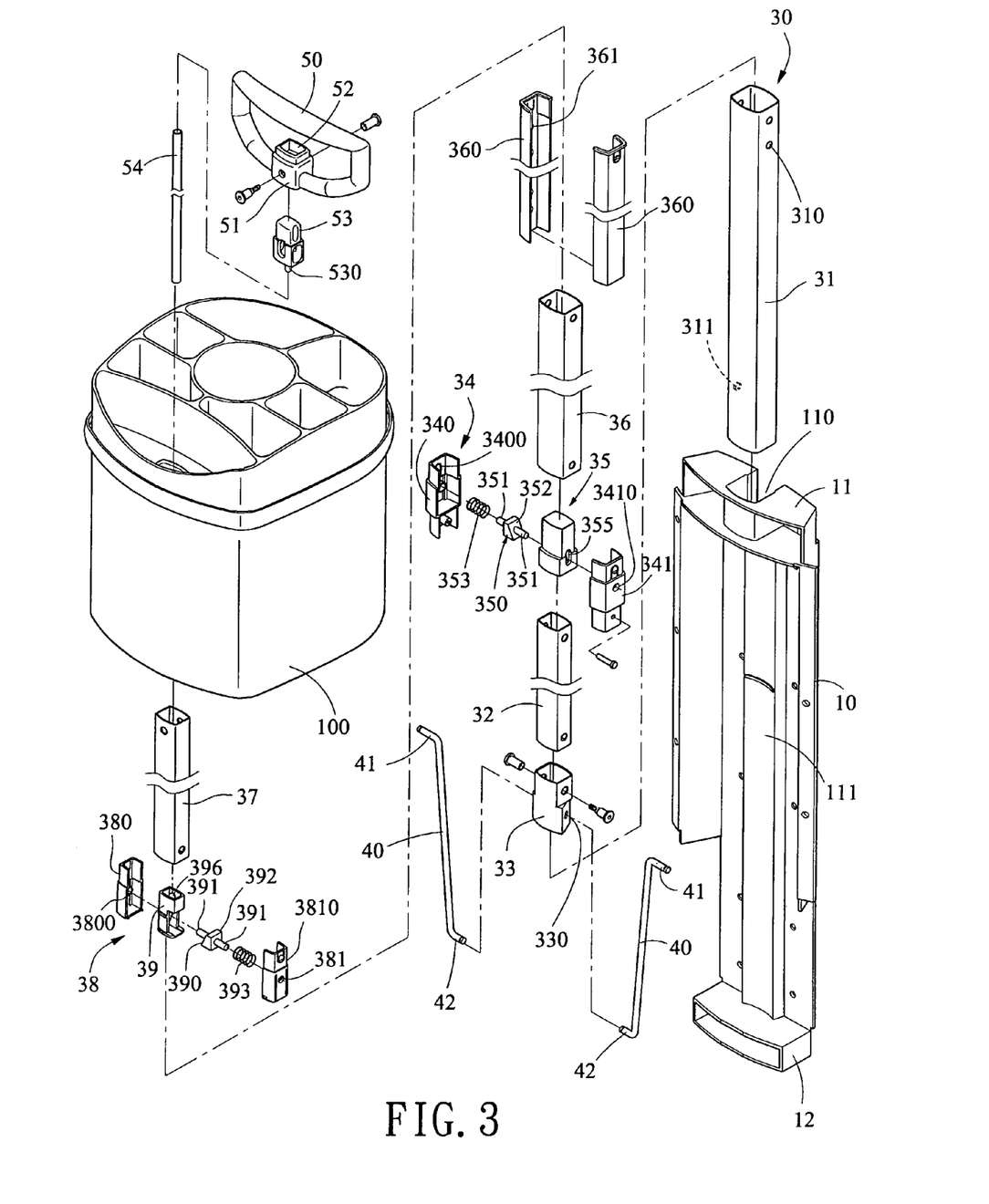
FIG. 3 is an exploded view of a retractable handle assembly of FIG. 1.

The support mechanism 10, as shown in FIGS. 1 to 3, is an elongate member having a somewhat curved outer surface. The support mechanism 10 comprises a top stop 11, a bottom stop 12, a longitudinal groove 110 coupled between the top stop 11 and the bottom stop 12, and a longitudinal projection 111 having a concave surface. A lower support tube 31 is inserted into the groove 110 to be spaced from the top stop 11 and the bottom stop 12 and urges against the concave surface of the projection 111. An upper limit aperture 310 and a lower limit aperture 311 are provided on the lower support tube 31. An abutment tube 32 is inserted into the lower support tube 31. A base tube 33 is disposed on top of the bottom stop 12 with the abutment tube 32 inserted therein. The base tube 33 has two side apertures 330 each pivotably coupled to a link arm 40. The link arm 40 has a first bent end 41 pivotably coupled to an intermediate aperture 242 (see FIG. 6) of each of the wheel mounts 24 and 24A, and a second bent end 42 pivotably coupled to two side apertures 330.

Figure 4:
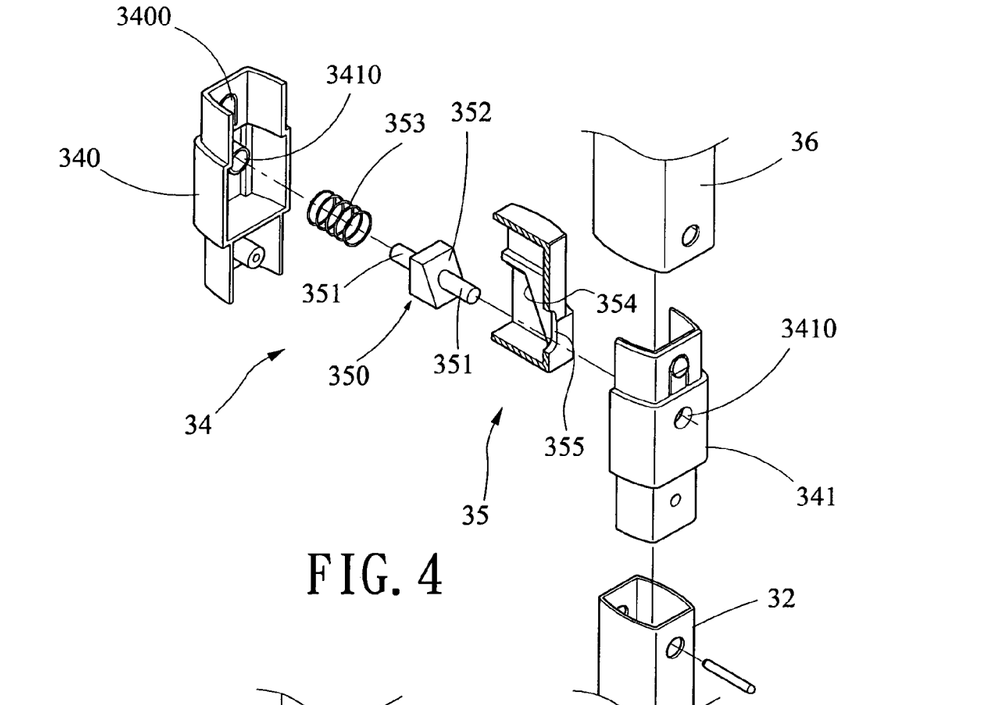
FIG. 4 is an exploded view of a lower coupling tube and a lower block.

As shown in FIGS. 3 to 4, a lower coupling tube 34 is secured between an upper support tube 36 and the lower abutment tube 32. The lower coupling tube 34 comprises mated first and second half housings 340 and 341. A lower block 35 is slidably disposed in the lower coupling tube 34. Each of the first and second half housings 340 and 341 has an upper aperture 3400 and an intermediate aperture 3410. The lower block 35 comprises a wedge 350 including a shaft 351, an oblique surface 352 at one side, and a spring 353 put on the shaft 351 at the other side in which two ends of the shaft 351 are slidably positioned at the opposite apertures 3410 with the spring 353 compressed. The lower block 35 further comprises an oblique surface 354 matingly coupled to the oblique surface 352, and a longitudinal trough 355 with the shaft 351 passed through. Also, the shaft 351 can move upwardly or downwardly in a range defined by the trough 355 as the lower block 35 slides.

Figure 5:
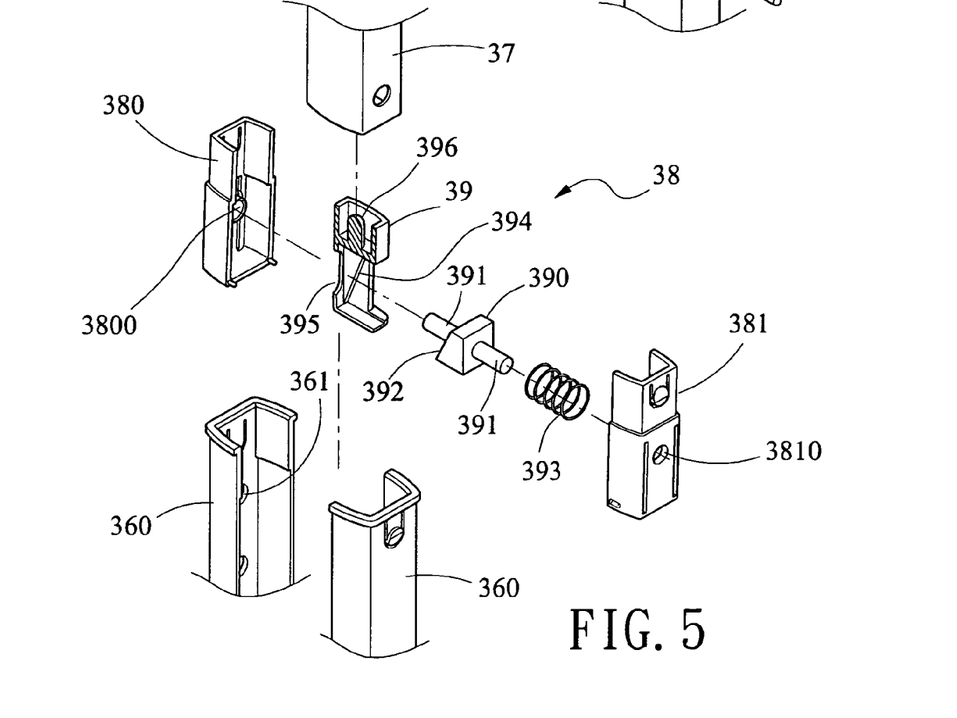
FIG. 5 is an exploded view of an upper coupling tube, an upper block, and positioning sleeves.

As shown in FIG. 3, two positioning sleeves 360 are provided on the interior wall of the upper support tube 36. One positioning sleeve 360 comprises a plurality of longitudinal apertures 361. The sliding tube 37 has its lower portion slidably disposed in the positioning sleeves 360. An upper coupling tube 38 is secured to the bottom of the sliding tube 37. As shown in FIG. 5, the upper coupling tube 38 comprises a first half housing 380 having an intermediate aperture 3800 and a mated second half housing 381 having an intermediate aperture 3810. An upper block 39 is disposed in the upper coupling tube 38. The upper block 39 comprises a wedge 390 including a shaft 391, an oblique surface 392 at the other side, and a spring 393 put on the shaft 391 at one side in which two ends of the shaft 391 are slidably positioned at the opposite apertures 3810 with the spring 393 compressed. The upper block 39 further comprises an oblique surface 394 matingly coupled to the oblique surface 392, a longitudinal trough 395 with the shaft 391 passed through so that the shaft 391 can move upwardly or downwardly in a range defined by the trough 395 as the upper block 39 slides, and a top post 396.

A handle 50, as best seen from FIG. 3, has a lower connection member 51 secured to the top of the sliding tube 37, a channel 52 through the connection member 51, and a push button 53 slidably disposed in the channel 52, the push button 53 having a bottom peg 530 fitted in the top of a connecting tube 54 in the sliding tube 37. The post 396 is fitted in the bottom of the connecting tube 54. This forms the construction of the support mechanism 10.

Figure 6:
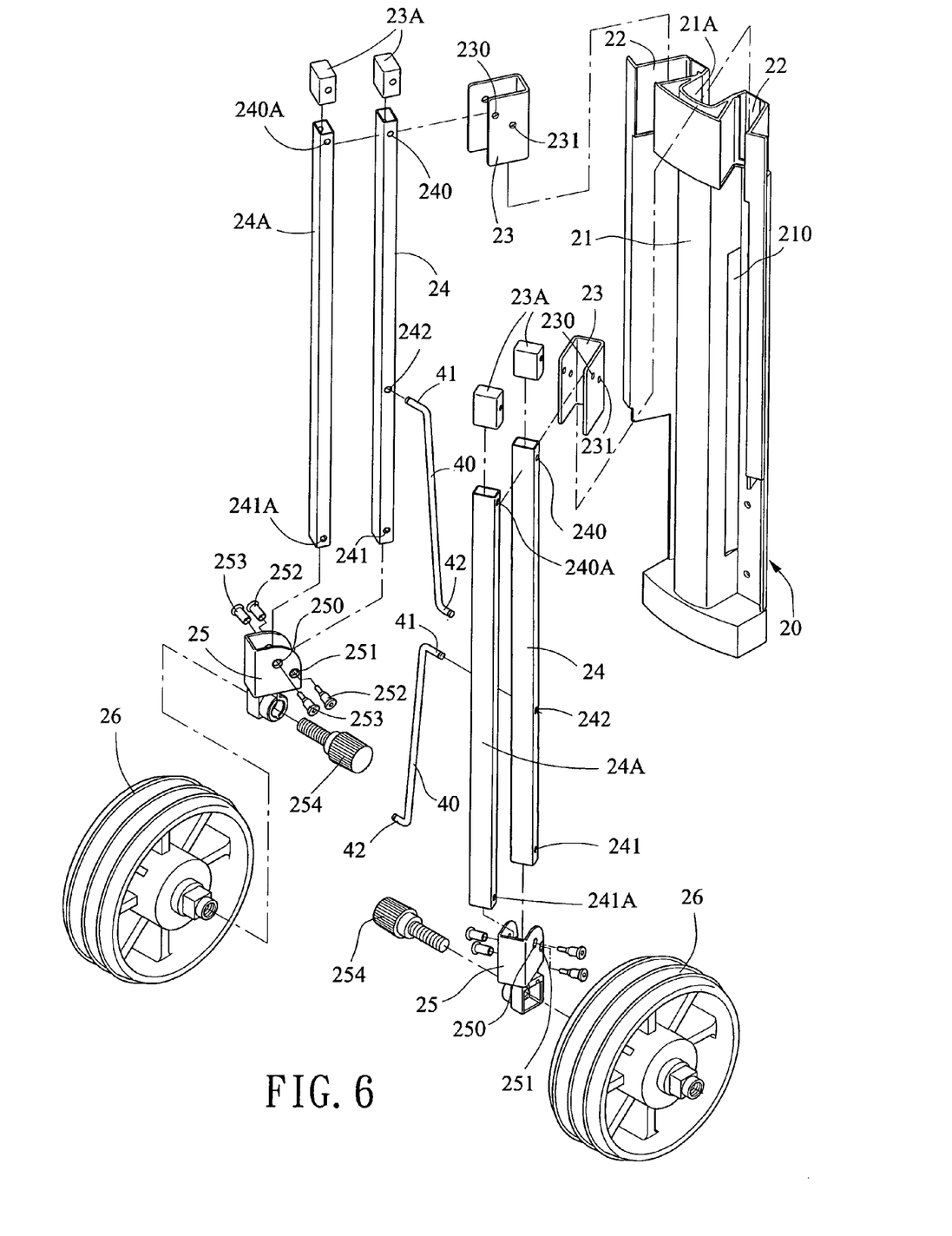
FIG. 6 is an exploded view of a wheel assembly FIG. 1.
Figure 7:
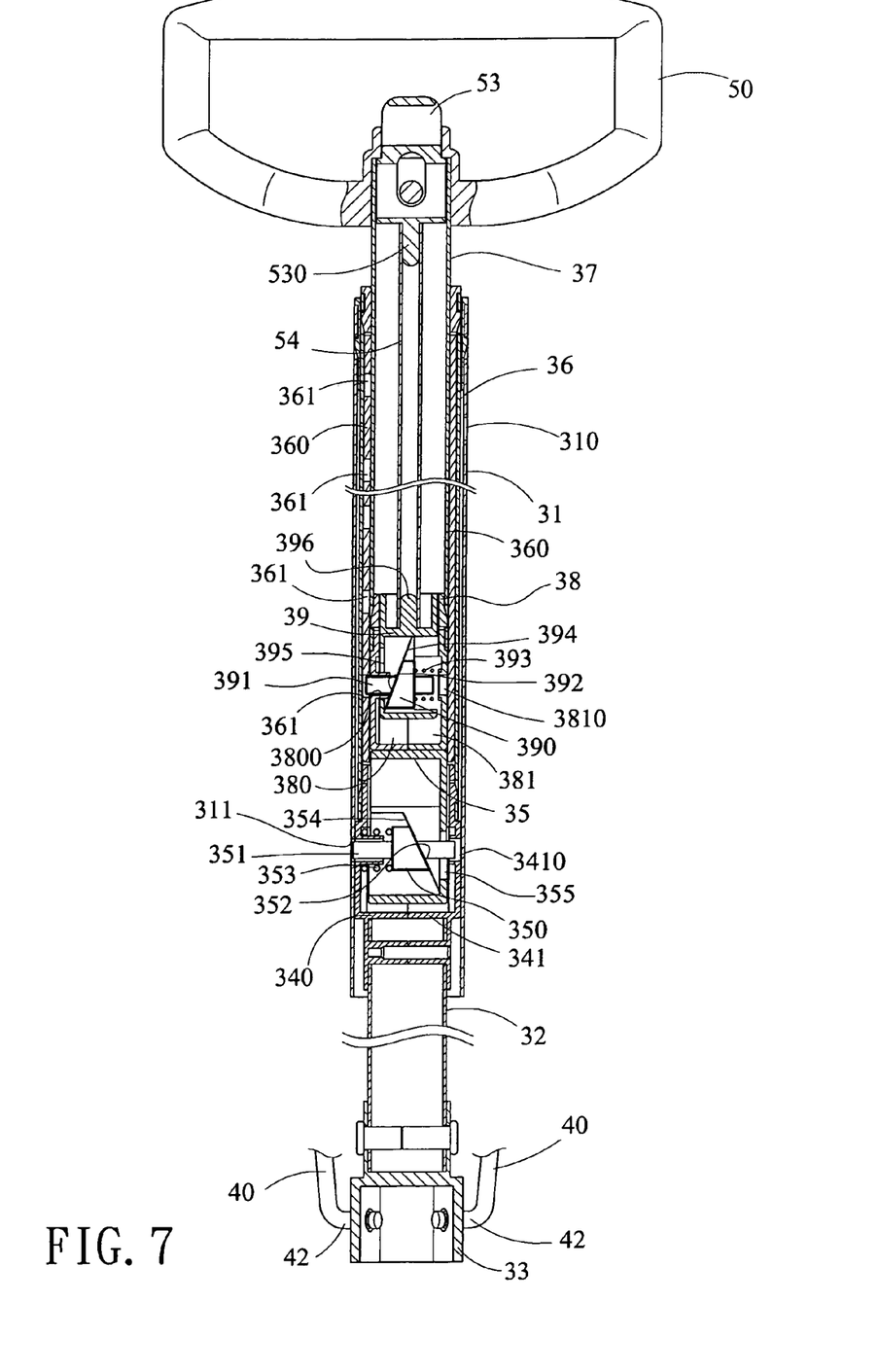
FIG. 7 is a cross-sectional view of the handle assembly in a retracted position.

As shown in FIGS. 2 and 6, the wheel assembly 20 is shaped to secure to the support mechanism 10. The wheel assembly 20 comprises an upwardly extended longitudinal protrusion 21 between two wheels 26. The longitudinal protrusion 21 comprises a longitudinal slot 21A for receiving the handle assembly 30. The wheel assembly 20 further comprises a longitudinal groove 210 at either side (see FIGS. 3, 6 and 12). The first bent ends 41 may pass the grooves 210 to pivotably couple to the apertures 330 of the base tube when the wheel assembly 20 and the support mechanism 10 are assembled together. A tunnel 22 having a flaring shape is provided on top of the longitudinal protrusion 21. A frame member 23 of metal (see FIG. 6) is fitted in the tunnel 22 and comprises a pair of upper apertures 230 and a pair of lower apertures 231. Each of the wheel mounts 24 and 24A has an upper aperture 240 or 240A pivotally coupled to the upper apertures 230 or 231. As an end, each pair of wheel mounts 24 and 24A are fitted in the frame member 23. The frame member 23 comprises two smoothing blocks 23A each fitted in the top of the wheel mount 24 or 24A for smoothing the pivoting of the wheel mounts 24 and 24A in the frame members 23. Two pairs of screws 252, 253 are driven through lower apertures 241, 241A of each pair of wheel mounts 24 and 24A and two pairs of apertures 250, 251 of either pivot member 25 of metal for fastening the wheel mounts 24 and 24A and the pivot member 25 together. Moreover, the pivot member 25 comprises a thumb screw 254 for securing to the wheel 26. This forms the construction of the wheel assembly 20.

In assembly, first fasten the wheel assembly 20 and the support mechanism 10 together. Next, insert the handle assembly 30 into the slot 21A. Pass the first bent ends 41 through the grooves 210 to fasten at the intermediate portions of the wheel mounts 24.

In an upright position of the unit (see FIG. 1), the container 101 is supported on the ground. A user can then insert golf clubs through the honeycomb structure 100 in the container 101 for storage. For moving the unit along a playing field, the user can pull the handle assembly 30 for actuating the link arms 40 to extend the wheel mounts 24 and 24A outwardly and upwardly (see FIGS. 12, 13). As an end, the user can pull the handle 50 for moving the unit (see FIG. 15).

A pulling force on the handle assembly 30 is reduced to a minimum to enable the pulling handle assembly 30 smoothly since the frame members 23 are particularly fastened in the flaring tunnels 22. In other words, the side thrust and the friction of the wheel mounts 24 and 24A is reduced to a minimum. As a result, this enables a smoothly pulling of the unit by only one hand.

Figure 14:
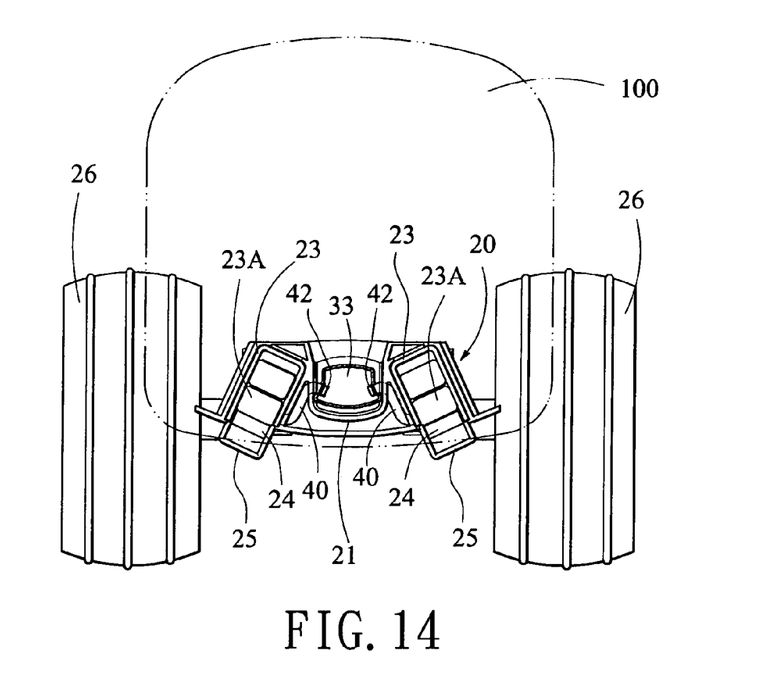
FIG. 14 is a schematic top plan view showing the retracted wheels.
Figure 15:
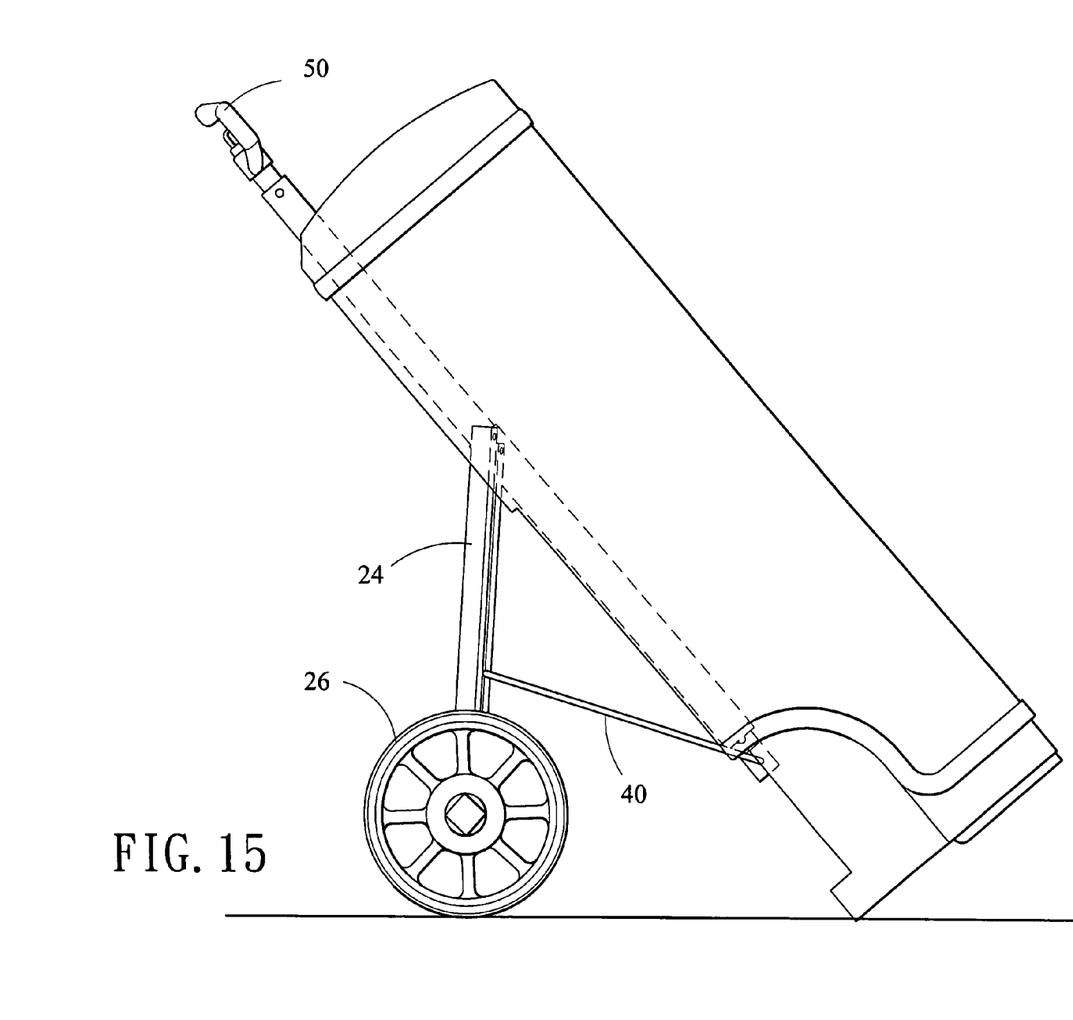
FIG. 15 is a side elevational view of the combined golf bag and golf cart with the wheels extended to be adapted to move along a supporting ground.

The handle assembly 30 is in a retracted position (see FIG. 7) and the link arm 40 is also in a retracted position (see FIGS. 2 and 14). The wheel mounts 24 and 24A nest against the tunnels 22. The shaft 391 is inserted in the aperture 361. Hence, the upper block 39 presses the lower block 35 to urge the oblique surface 354 against the oblique surface 352, thereby moving the wedge 350 outwardly toward the lower limit aperture 311 by compressing the spring 353. As an end, the shaft 351 moves in the lower limit aperture 311 for locking.

Figure 8:
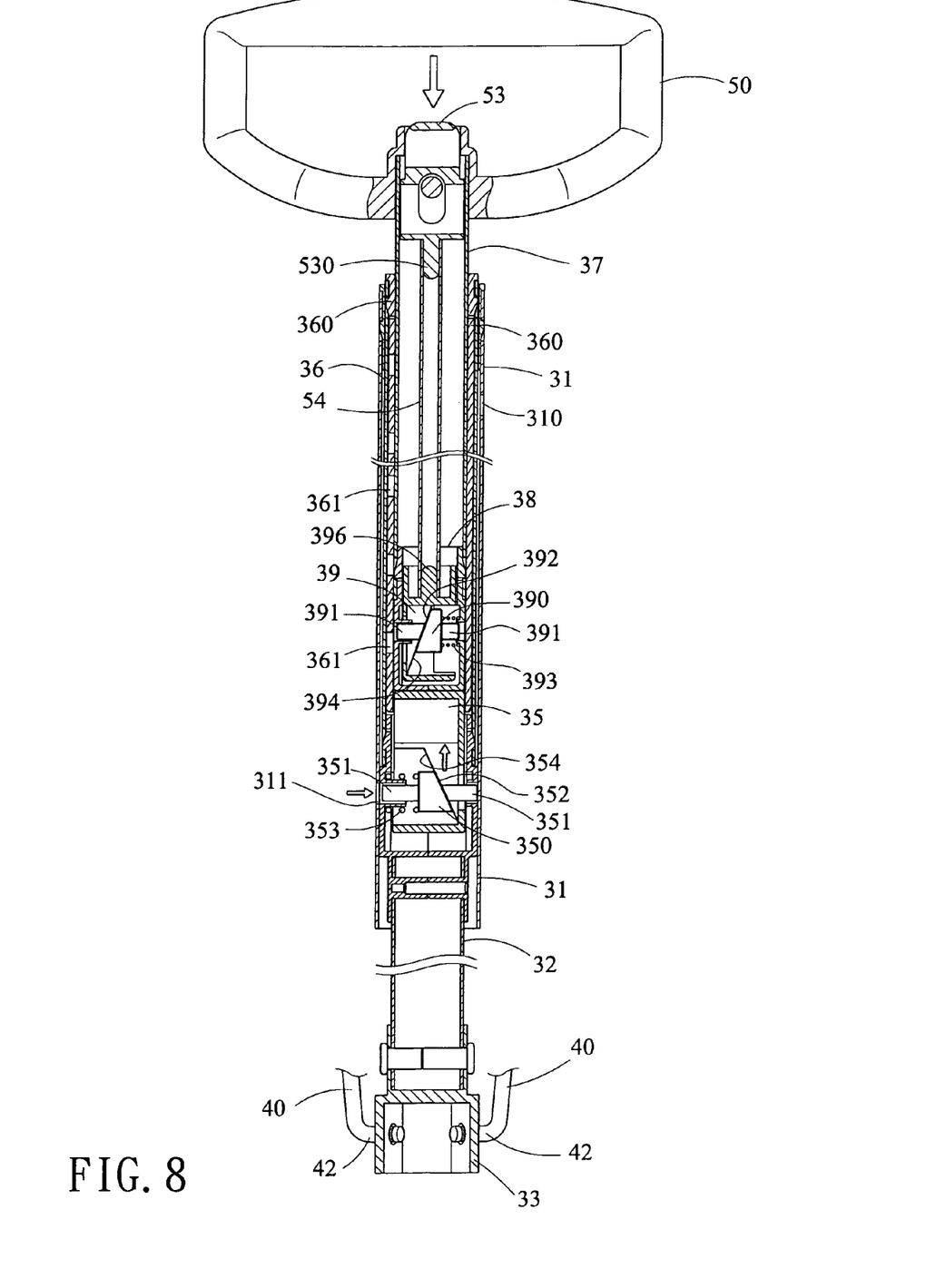
FIG. 8 is a cross-sectional view of the handle assembly to be extended by pressing a push button.
Figure 9:
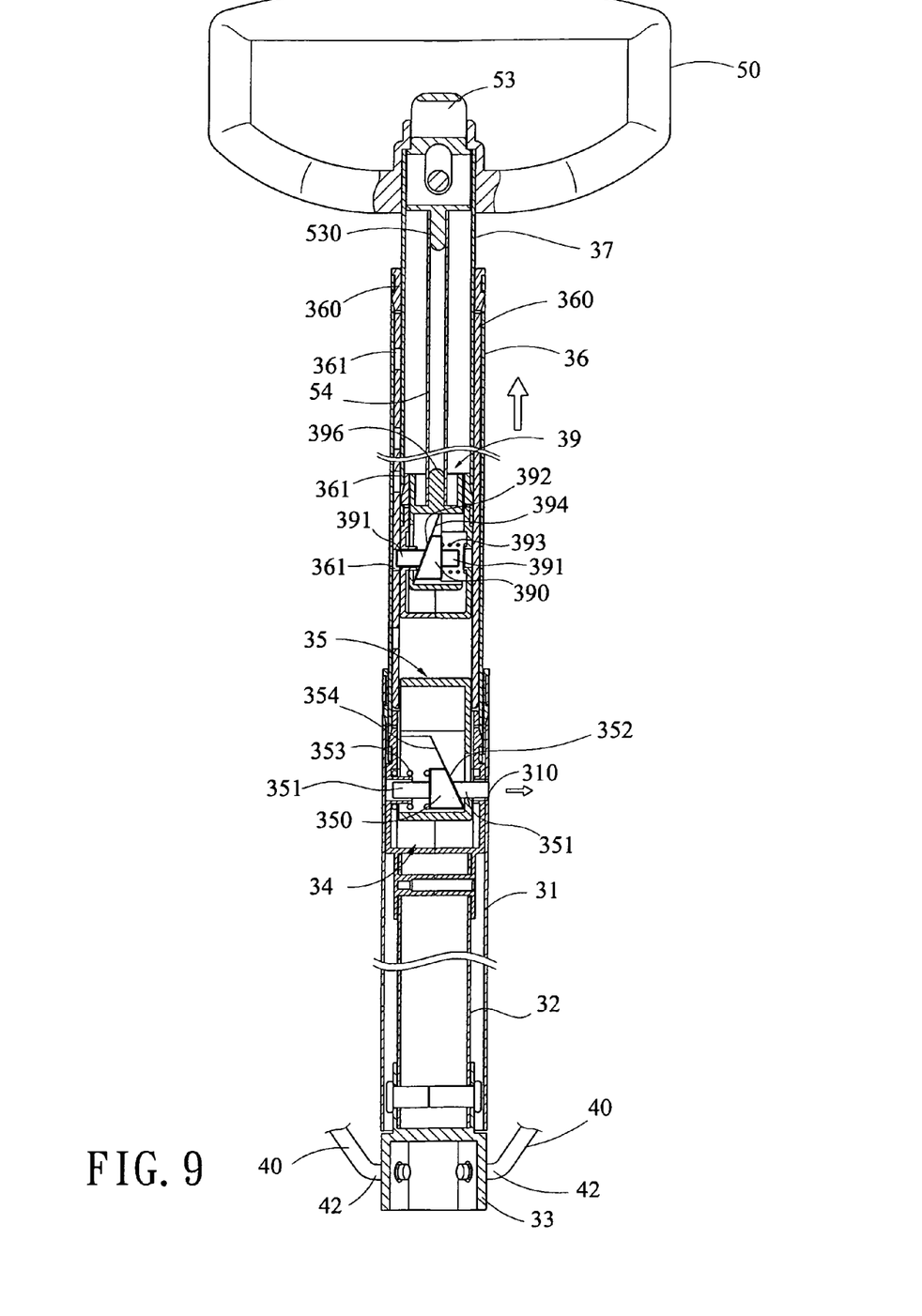
FIG. 9 is a cross-sectional view of the handle assembly, where a sliding tube of the handle assembly is extending.

For extending the handle assembly 30, a user can simply hold the handle 50 with one hand while pressing the push button 53 with one finger (see FIG. 8). The push button 53 is thus pressed down to lower the connecting tube 54 and press the upper block 39 for urging the oblique surface 394 against the oblique surface 392, resulting in a moving of the wedge 39. Also, the spring 393 is compressed to cause the shaft 391 to clear from the aperture 361. To the contrary, a release of the finger from the push button 53 will unlock the lower block 35. The spring 353 thus expands laterally to move the wedge 350 in an opposite direction. Next, the lower block 35 will move upward due to the engagement of the oblique surfaces 354, 352. The upper block 39 then moves upward to be misaligned with the aperture 361 because the shaft 391 has not moved in the aperture 361 yet (FIG. 8). At this time, the shaft 351 will move back to the lower block 35 by the expanding spring 353. Hence, the shaft 351 is unlocked by the lower support tube 31. Thus, the user can pull the handle 50 with the sliding tube 37 moving upward also. Further, the shaft 391 is pushed by the spring 393 to move in the aperture 361 only higher than the immediate bottommost aperture 361 (FIG. 9). As a result, a distance is formed between the upper block 39 and the lower block 35. At this moment, a further pulling of the handle 50 will cause the shaft 391 to move in the aperture 361 for locking with the upper support tube 36 and the abutment tube 32 moving upward together. Also, the upper support tube 36 projects from the top of the lower support tube 31. Finally, the shaft 351 is pushed by the spring 353 to move in the upper limit aperture 310 for locking (FIG. 9). At the same time, the abutment tube 32 moves upward as the upper support tube 36 moves upward, resulting in a movement of the base tube 33 and the link arms 40. The link arms 40 will move outward to cause the wheel mounts 24 and 24A to extend laterally out of the tunnels 22 (see FIG. 12).

Figure 10:
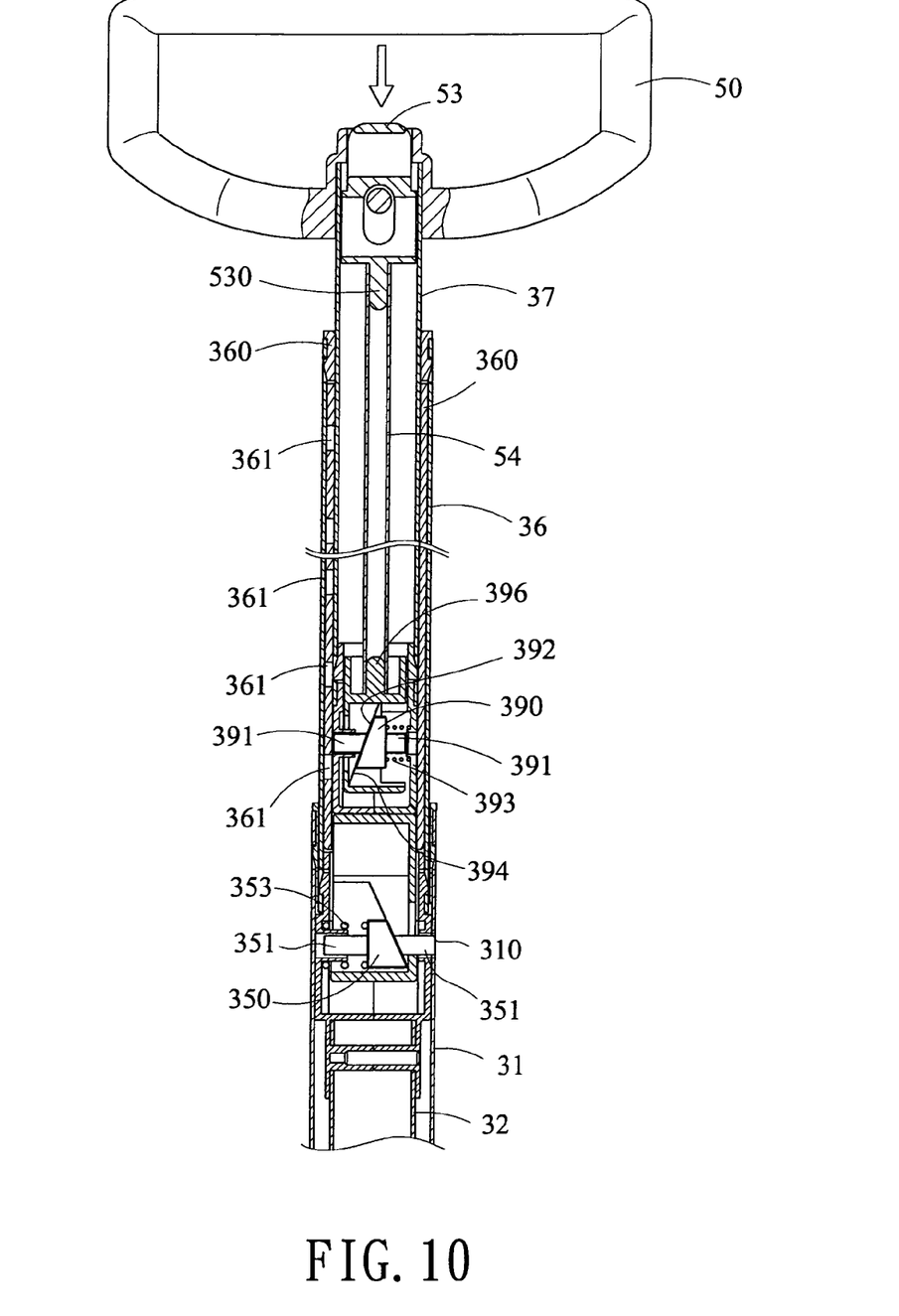
FIG. 10 is a cross-sectional view of the handle assembly, where a sliding tube is about to extend by pressing the push button.
Figure 11:
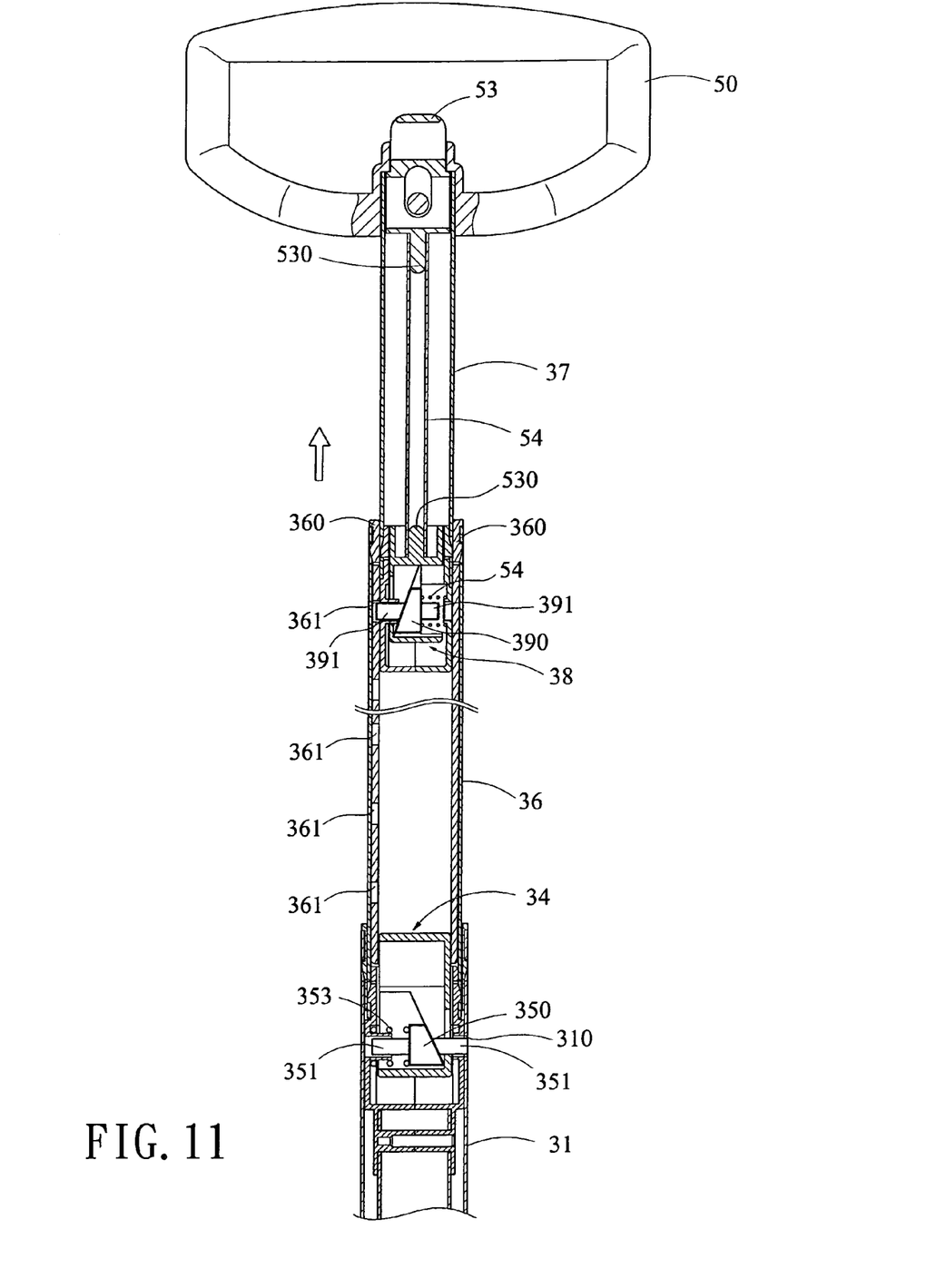
FIG. 11 is a cross-sectional view of the handle assembly, where the sliding tube has been fully extended.
Figure 12:
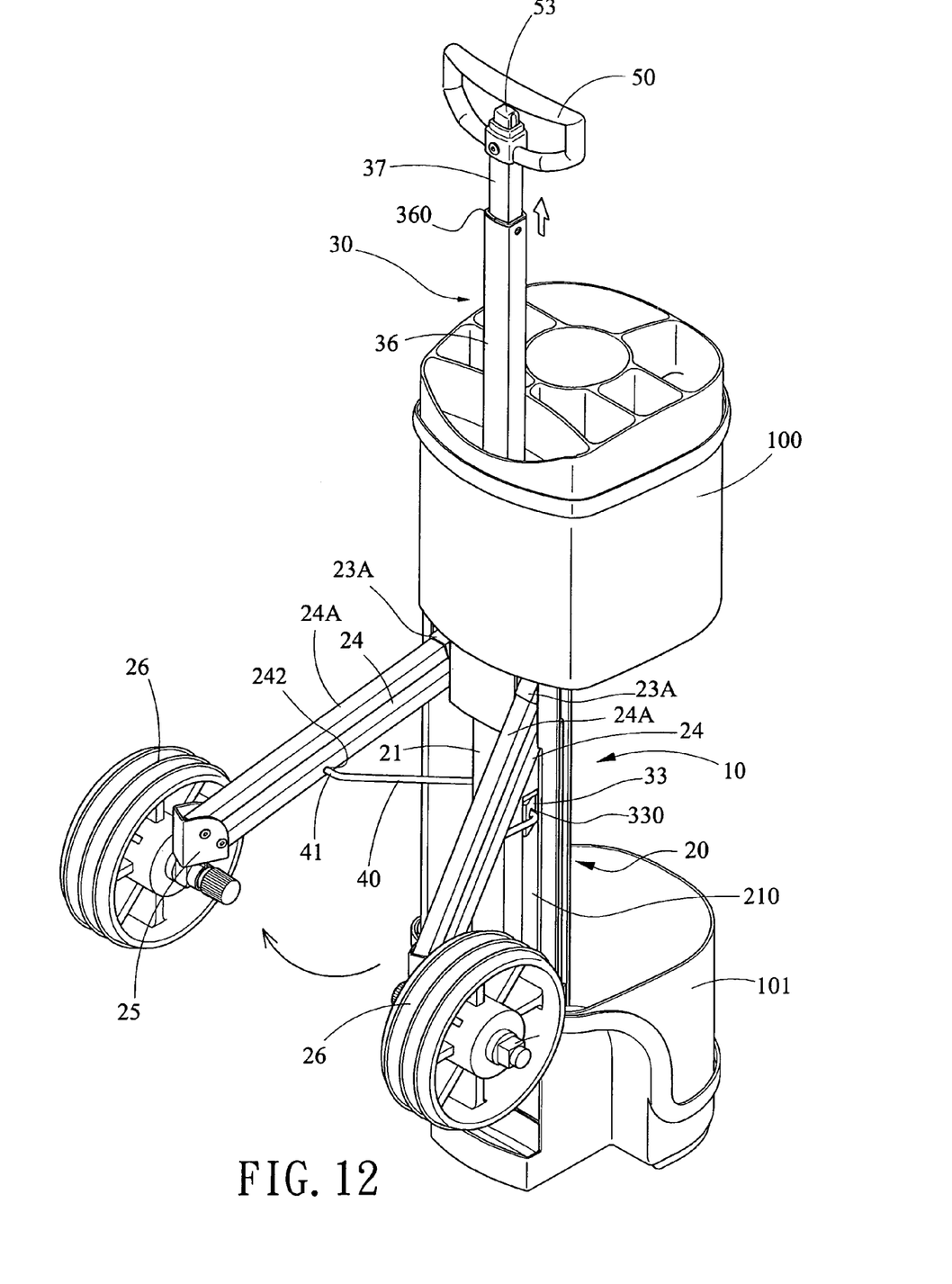
FIG. 12 is a perspective view of the combined golf bag and golf cart, where the golf cart is in an extended position.

As shown in FIGS. 10 and 11, the provision of a plurality of apertures 361 on the positioning sleeve 360 aims at fitting different individuals with various heights. That is, the length of the handle assembly 30 is adjustable. In detail, a simple pressing of the push button 53 will lower the connecting tube 54 to press the upper block 39. Also, the oblique surface 394 is urged against the oblique surface 392, resulting in a moving of the wedge 39 toward the spring 393 for compression. As such, the shaft 391 clears from the aperture 361 (see FIG. 10). At this moment, the user can adjust the length of the sliding tube 37 projected from the top of the upper support tube 36 (see FIG. 11). To the contrary, a release of the finger from the push button 53 will cause the shaft 391 to move back toward the aperture 361 by the expansion of the spring 393. Thus, a proximate aperture 361 can be chosen for locking the shaft 391 therein.

While the invention herein disclosed has been described by means of specific embodiments, numerous modifications and variations could be made thereto by those skilled in the art without departing from the scope and spirit of the invention set forth in the claims.

What is claimed is:

1. A combination golf bag and golf cart, comprising:
    a wheel assembly comprising two pairs of wheel mounts, each pair having a wheel; and
    a longitudinal support mechanism detachably formed with the wheel assembly, the support mechanism comprising:
    a lower support tube fastened in the support mechanism, the lower support tube including an upper limit aperture and a lower limit aperture;
    an abutment tube inserted into the lower support tube;
    two link arms each having one end pivotably coupled to the side of the abutment tube proximate a bottom of the abutment tube and the other end pivotably coupled to an aperture of each wheel mount;
    a lower coupling tube secured to the abutment tube, the lower coupling tube including a sliding lower block, the lower block including a first shaft extended in the upper limit aperture in a retracted position of the combination golf bag and golf cart wherein one end of the first shaft clears from the upper limit aperture when the lower block is pressed for inserting the other end of the first shaft in the lower limit aperture;
    an upper support tube secured to the lower coupling tube, the upper support tube being fastened in the lower support tube and including a plurality of longitudinal apertures;
    a sliding tube slidably disposed in the upper support tube;
    an upper coupling tube secured to a bottom of the sliding tube, the upper coupling tube including a sliding upper block, the upper block including a second shaft extended in one of the apertures in a retracted position of the combination golf bag and golf cart wherein the other end of the first shaft clears from the aperture of the upper support tube when the upper block is pressed for inserting one end of the second shaft in the lowest one of the apertures of the upper support tube, and the upper block is adapted to actuate the lower block; and
    a retractable handle assembly including a handle inserted in the sliding tube, the handle including a push button operable for unlocking the wheel assembly and extending the wheel mounts outwardly.

2. The combination golf bag and golf cart of claim 1, wherein the support mechanism is an elongate member having a substantially curved outer surface and the support mechanism further comprises a top stop, a bottom stop, a longitudinal first groove coupled between the stops, and a longitudinal projection having a concave surface so that the lower support tube is adapted to insert into the first groove to be spaced from the stops and urges against the concave surface of the projection.

3. The combination golf bag and golf cart of claim 1, further comprising a base tube on the bottom stop with the abutment tube inserted therein, the base tube including two side apertures each pivotably coupled to the link arm, and wherein each link arm having a first bent end pivotably coupled to the intermediate aperture of each wheel mount and a second bent end pivotably coupled to the side apertures.

4. The combination golf bag and golf cart of claim 1, wherein the lower coupling tube further comprises mated first and second half housings each having an upper aperture and an intermediate aperture, a first wedge with the first shaft formed thereon, the first wedge including a first oblique surface at one side, a first spring put on the first shaft at the other side, and two ends of the first shaft are slidably positioned at the opposite lower apertures of the lower coupling tube with the first spring compressed, and the lower block further comprises a second oblique surface matingly coupled to the first oblique surface, and a longitudinal first trough with the first shaft passed through so that the first shaft is capable of moving longitudinally in a range defined by the first trough as the lower block slides.

5. The combination golf bag and golf cart of claim 1, wherein the support mechanism further comprises two opposite positioning sleeves on an interior wall of the upper support tube, and one of the positioning sleeve comprises a plurality of longitudinal apertures.

6. The combination golf bag and golf cart of claim 1, wherein the upper coupling tube comprises mated first and second half housings each having an intermediate aperture, the upper block is disposed in the upper coupling tube, the upper block including a second wedge with the second shaft formed thereon, the second wedge including a third oblique surface at the other side, a second spring put on the second shaft at one side, and two ends of the second shaft are slidably positioned at the opposite apertures of the upper coupling tube with the second spring compressed, and the upper block further comprises a fourth oblique surface matingly coupled to the third oblique surface, and a longitudinal second trough with the second shaft passed through so that the second shaft is capable of moving longitudinally in a range defined by the second trough as the upper block slides.

7. The combination golf bag and golf cart of claim 1, wherein the handle further comprises a lower connection member secured to a top of the sliding tube, a channel through the connection member with the push button slidably disposed therein, a bottom peg extended downwardly from the push button, the support mechanism further comprising a connecting tube in the sliding tube with the peg fitted in a top of the connecting tube, and the upper block further comprises a top post fitted in a bottom of the connecting tube.

8. The combination golf bag and golf cart of claim 1, wherein the wheel assembly is shaped to secure to the support mechanism, and the wheel assembly further comprises an upwardly extended longitudinal protrusion between the wheels, the longitudinal protrusion including a longitudinal slot for receiving the handle assembly, and a longitudinal second groove at either side so as to allow the first bent ends of the link arm to pass the second grooves to pivotably couple to sides aperture of the base tube.

9. The combination golf bag and golf cart of claim 1, wherein the wheel assembly further comprises a flaring tunnel at either side on top of the longitudinal protrusion, two frame members of metal fitted in the tunnels, the frame members being pivotably coupled to each pair of wheel mounts, and two pivot members of metal each at a bottom of each pair of wheel mount, the pivot members being pivotably coupled to the wheels.

10. The combination golf bag and golf cart of claim 9, wherein each frame member comprises two smoothing blocks each fitted in a top of the wheel mount.

11. The combination golf bag and golf cart of claim 1, wherein a rear portion of the wheel assembly is detachably coupled to a front portion of the support mechanism, and the tunnels are curved outwardly, rearwardly.

12. The combination golf bag and golf cart of claim 1, wherein each one of the wheel mounts and the support mechanism has a section of arcuate shape.

13. The combination golf bag and golf cart of claim 5, wherein a pressing of the push button lowers the connecting tube to press the upper block for urging the fourth oblique surface against the third oblique surface, moving the second wedge for compressing the second spring to unlock the second shaft, and enabling an adjustment of the length of the sliding tube projected from the upper support tube; and a releasing of force exerted on the push button moves the second shaft into a locked position by the expanding second spring so that a proximate one of the apertures of the positioning sleeves is adapted to lock the second shaft therein, thereby carrying out a length adjustment of the handle assembly.

14. The combination golf bag and golf cart of claim 6, wherein a pulling of the handle with one hand while pressing the push button with one finger lowers the connecting tube and the upper block for urging the fourth oblique surface against the third oblique surface, moving the second wedge for compressing the second spring to unlock the second shaft; and a release of the finger from the push button unlocks the lower block for expanding the first spring laterally, moving the first wedge oppositely, moving the lower block upward by engaging the first and the second oblique surfaces, moving the upper block upward, and moving the first shaft by the expanding first spring for unlocking the first shaft from the lower support tube, a pulling of the handle for moving the sliding tube upward, pushing the second shaft by the second spring to move in an aperture higher than the bottommost aperture of the positioning sleeves so as to form a distance between the upper block and the lower block, and a further pulling of the handle moves the second shaft into a locking position with the upper support tube and the abutment tube moving upward together, the upper support tube being projected from the lower support tube, pushing the first shaft by the expanding first spring to move in the upper limit aperture for locking, the abutment tube being moved upward as the upper support tube moves upward, moving the base tube, and moving the link arms outward to cause the wheel mounts to extend laterally out of the tunnels.

* * * * *